(12) United States Patent
Walker et al.

(10) Patent No.: US 10,296,250 B2
(45) Date of Patent: May 21, 2019

(54) METHOD AND APPARATUS FOR IMPROVING PERFORMANCE OF SEQUENTIAL LOGGING IN A STORAGE DEVICE

(71) Applicant: Intel Corporation, Santa Clara, CA (US)

(72) Inventors: Benjamin L. Walker, Chandler, AZ (US); August A. Camber, Rocklin, CA (US); Jonathan Bryan Stern, Tempe, AZ (US); Sanjeev Trika, Portland, OR (US); Richard P. Mangold, Forest Grove, OR (US); Jawad Basit Khan, Cornelius, OR (US); Anand Ramalingam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/176,650

(22) Filed: Jun. 8, 2016

(65) Prior Publication Data

US 2017/0357462 A1    Dec. 14, 2017

(51) Int. Cl.
*G06F 17/30* (2006.01)
*G06F 3/06* (2006.01)
*G06F 12/06* (2006.01)

(52) U.S. Cl.
CPC .......... *G06F 3/0626* (2013.01); *G06F 3/0659* (2013.01); *G06F 3/0661* (2013.01); *G06F 3/0683* (2013.01); *G06F 12/06* (2013.01); *G06F 17/30185* (2013.01); *G06F 2212/1056* (2013.01); *G06F 2212/261* (2013.01); *G06F 2212/401* (2013.01)

(58) Field of Classification Search
None
See application file for complete search history.

(56) References Cited

U.S. PATENT DOCUMENTS

| 6,535,949 | B1 * | 3/2003 | Parker | G06F 3/0616 |
| | | | | 707/999.202 |
| 2003/0018878 | A1 * | 1/2003 | Dorward | G06F 17/30073 |
| | | | | 711/216 |
| 2005/0114595 | A1 * | 5/2005 | Karr | G06F 3/0607 |
| | | | | 711/114 |

(Continued)

FOREIGN PATENT DOCUMENTS

WO    2016014368 A1    1/2016

OTHER PUBLICATIONS

LightNVM.io, "Open-Channel Solid State Drives NVMe Specification", Revision 1.2, Apr. 2016, 24 pages.

(Continued)

*Primary Examiner* — Kaushikkumar M Patel
(74) *Attorney, Agent, or Firm* — Alliance IP, LLC (57) ABSTRACT

In one embodiment, an apparatus comprises a storage device to receive, from a computing host, a request to append data to a data log. The storage device is further to identify a memory location after a last segment of the data log, append the data to the data log by writing the data to the memory location after the last segment of the data log, and provide, to the computing host, a key comprising an identification of the memory location at which the data was appended to the data log.

21 Claims, 5 Drawing Sheets

(56) References Cited

U.S. PATENT DOCUMENTS

| | | | | |
|---|---|---|---|---|
| 2006/0156064 | A1* | 7/2006 | Damani | G06F 11/1471 |
| | | | | 714/16 |
| 2009/0222596 | A1* | 9/2009 | Flynn | G06F 3/061 |
| | | | | 710/22 |
| 2010/0010967 | A1* | 1/2010 | Muller | G06F 17/30587 |
| | | | | 707/E17.014 |
| 2010/0191919 | A1* | 7/2010 | Bernstein | G06F 3/0623 |
| | | | | 711/141 |
| 2011/0295969 | A1* | 12/2011 | Bernstein | G06F 11/1471 |
| | | | | 709/217 |
| 2013/0024460 | A1 | 1/2013 | Peterson et al. | |
| 2014/0089264 | A1* | 3/2014 | Talagala | G06F 11/1471 |
| | | | | 707/649 |
| 2014/0325115 | A1* | 10/2014 | Ramsundar | G06F 12/0238 |
| | | | | 711/102 |
| 2015/0193338 | A1 | 7/2015 | Sundaram et al. | |
| 2015/0370655 | A1* | 12/2015 | Tucek | G06F 3/0619 |
| | | | | 714/15 |
| 2016/0124984 | A1* | 5/2016 | Ji | G06F 17/30138 |
| | | | | 707/693 |
| 2016/0203053 | A1* | 7/2016 | Talagala | H04L 67/1097 |
| | | | | 714/6.12 |
| 2016/0371291 | A1* | 12/2016 | Shamis | G06F 17/30097 |

OTHER PUBLICATIONS

NVM Express, Inc., "NVM Express Revision 1.2.1", Jun. 5, 2016, 217 pages.
International Search Report and Written Opinion issued in PCT Application No. PCT/US2017/034910 dated Sep. 6, 2017; 11 pages.

\* cited by examiner

METHOD AND APPARATUS FOR IMPROVING PERFORMANCE OF SEQUENTIAL LOGGING IN A STORAGE DEVICE

FIELD

The present disclosure relates in general to the field of computer development, and more specifically, to storage devices.

BACKGROUND

A computer system may include one or more central processing units (CPUs) coupled to one or more storage devices. A CPU may include a processor to execute an operating system and other software applications that utilize the storage devices coupled to the CPU. The software applications may request various operations relating to the storage devices, such as the creation of a data log, a write to a data log, and a read from a data log.

BRIEF DESCRIPTION OF THE DRAWINGS

Like reference numbers and designations in the various drawings indicate like elements.

DETAILED DESCRIPTION

Although the drawings depict particular computer systems, the concepts of various embodiments are applicable to any suitable integrated circuits and other logic devices. Examples of devices in which teachings of the present disclosure may be used include desktop computer systems, server computer systems, storage systems, handheld devices, tablets, other thin notebooks, systems on a chip (SOC) devices, and embedded applications. Some examples of handheld devices include cellular phones, digital cameras, personal digital assistants (PDAs), and handheld PCs. Embedded applications may include a microcontroller, a digital signal processor (DSP), a system on a chip, network computers (NetPC), set-top boxes, network hubs, wide area network (WAN) switches, or any other system that can perform the functions and operations taught below.

Figure 1:
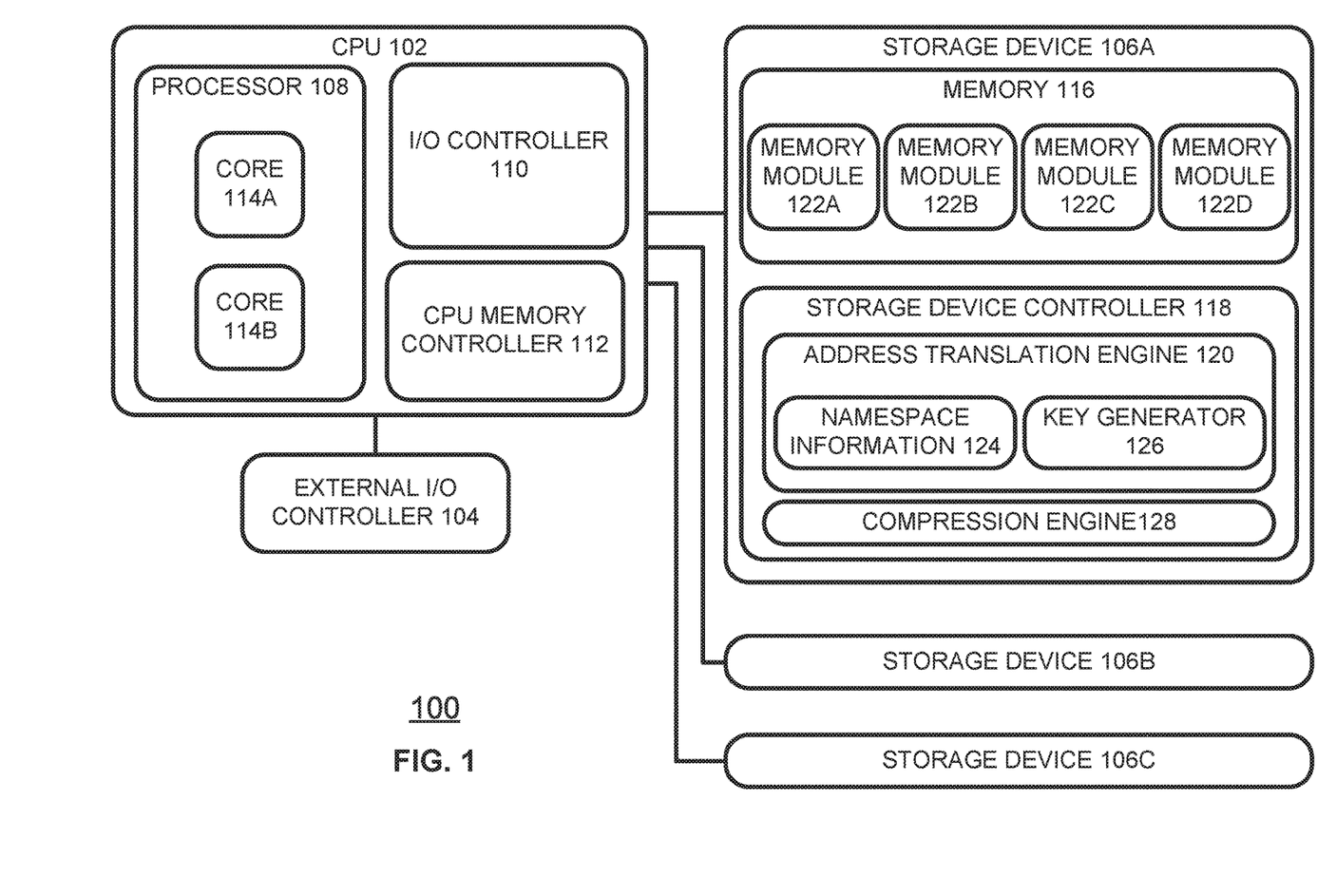
FIG. 1 illustrates a block diagram of components of a computer system in accordance with certain embodiments.

FIG. 1 illustrates a block diagram of components of a computer system 100 in accordance with certain embodiments. System 100 includes a central processing unit (CPU) 102 coupled to an external input/output (I/O) controller 104 and a plurality of storage devices 106. During operation, data may be transferred between storage devices 106 and the CPU 102. In various embodiments, particular data operations involving a storage device 106 may be managed by an operating system or other software application executed by processor 108.

Storage devices such as NAND flash storage devices, solid state drives, or hard disk drives may implement block-based interfaces that expose memory regions in logical groupings (e.g., blocks or sectors) to a computing host coupled to the storage device. A computing host may represent any suitable entity operable to communicate with a storage device, such as a CPU or other logic device. While relatively small block sizes of the memory may be written to, data is typically erased in large block sizes (often on the order of megabytes). To support a block-based interface, a storage device may implement a complicated translation layer that maps logical blocks to different memory regions of the storage device that are currently available for writing. Maintaining the mapping may involve significant complexity in firmware of the storage device, including wear leveling functionality and background garbage collection functionality to maintain free space lists. Non-volatile storage or capacitors may also be implemented by such devices to ensure that the mapping is persistent when power is lost. Block-based interfaces may also suffer from write amplification, where the actual amount of physical information written is a multiple of the logical amount intended to be written (due to data movement requirements resulting from the difference in granularity between erases and writes).

Various data sets written to a storage device may have characteristics that allow for simpler implementation of storage devices that store such data sets. For example, particular data logs may be written sequentially. That is, when a data log is updated, the existing data of the data log is not changed, but additional data is added to the end (i.e., after the last segment) of the data log. Sequentially written data logs may include logging and journaling workloads that may be used in log-structured data log-systems, log-structured merge trees used in some databases, backup systems, and version-control systems, among other systems. In such workloads, data is written sequentially in varying sized chunks to a set of data logs and read randomly. A data log may comprise any collection of data that may be written to memory of a storage device and may have any suitable structure. For example, the data log may be a file, a stream of data, or other suitable collection of data. In various embodiments, the storage device that stores the data log may or may not implement a file system.

In various embodiments, a storage device 106 may implement a new command set that takes advantage of the nature of such workloads to simplify implementation of the storage device. The command set may include a data log append command that may be used to add data to a data log by appending the data to the end of the data log. Because the data is added to the end of the data log, the computing host (e.g., CPU 102) that sends the command does not have to provide a memory location of the end of the data log in the data log append command, but rather the storage device 106 may track the end of the data log. In various embodiments, in response to a data log append command, a storage device 106 may generate a key including location information indicating the memory location at which the data was appended and return the key to the computing host. The computing host may include the key in a read append data log command to read back a portion of the data log (i.e., a data log segment) that corresponds to the key (e.g., that is located at a memory address indicated by the key).

Embodiments of the present disclosure may offer various technical advantages, such as simplifying the software of the computing host, simplifying the logic of a storage device, and improving the performance of a storage device. For example, the software of the computing host does not need to track the location of an end of a data log to which it is appending. As another example, the address translation layer of the storage device may be greatly simplified. As another example, segments of a data log written to the storage device may be unmapped in the same order in which they were written or all at once, thus the unmapping may be directed by the computing host rather than the device, obviating the need for intelligent garbage collection. As another example, write amplification may be minimized since no overwrites occur when data is appended to the end of a data log. As yet another example, sequential writes are faster than non-sequential writes for many storage devices, including solid state drives and hard disk drives.

CPU 102 comprises a processor 108, such as a microprocessor, an embedded processor, a digital signal processor (DSP), a network processor, a handheld processor, an application processor, a co-processor, a system on a chip (SOC), or other device to execute code (i.e., software instructions). Processor 108, in the depicted embodiment, includes two processing elements (cores 114A and 114B in the depicted embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 114 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 110 is an integrated I/O controller that includes logic for communicating data between CPU 102 and I/O devices, which may refer to any suitable devices capable of transferring data to and/or receiving data from an electronic system, such as CPU 102. For example, an I/O device may be an audio/video (A/V) device controller such as a graphics accelerator or audio controller; a data storage device controller, such as a flash storage device, magnetic storage disk, or optical storage disk controller; a wireless transceiver; a network processor; a network interface controller; or a controller for another input devices such as a monitor, printer, mouse, keyboard, or scanner; or other suitable device. In a particular embodiment, an I/O device may comprise a storage device 106 coupled to the CPU 102 through I/O controller 110.

An I/O device may communicate with the I/O controller 110 of the CPU 102 using any suitable signaling protocol, such as peripheral component interconnect (PCI), PCI Express (PCIe), Universal Serial Bus (USB), Non-Volatile Memory Express (NVMe), Serial Attached SCSI (SAS), Serial ATA (SATA), Fibre Channel (FC), IEEE 802.3, IEEE 802.11, or other current or future signaling protocol. In various embodiments, I/O devices coupled to the I/O controller may be located off-chip (i.e., not on the same chip as CPU 102) or may be integrated on the same chip as the CPU 102.

CPU memory controller 112 is an integrated memory controller that includes logic to control the flow of data going to and from the storage devices 106. CPU memory controller 112 may include logic operable to read from a storage device 106, write to a storage device 106, or to request other operations from a storage device 106. In various embodiments, CPU memory controller 112 may receive write requests from cores 114 and/or I/O controller 110 and may provide data specified in these requests to a storage device 106 for storage therein. CPU memory controller 112 may also read data from a storage device 106 and provide the read data to I/O controller 110 or a core 114. During operation, CPU memory controller 112 may issue commands including one or more addresses (e.g., row and/or column addresses) of the storage device 106 in order to read data from or write data to memory (or to perform other operations). CPU memory controller 112 may also issue data log append commands that do not include an address of the storage device 106 in order to append data to the end of a data log, read sequential data log commands that include a key returned from a data log append command performed by the storage device 106, or other commands described herein. In some embodiments, CPU memory controller 112 may be implemented on the same chip as CPU 102, whereas in other embodiments, CPU memory controller 112 may be implemented on a different chip than that of CPU 102.

The CPU 102 may also be coupled to one or more other I/O devices through external I/O controller 104. In a particular embodiment, external I/O controller 104 may couple a storage device 106 to the CPU 102. External I/O controller 104 may include logic to manage the flow of data between one or more CPUs 102 and I/O devices. In particular embodiments, external I/O controller 104 is located on a motherboard along with the CPU 102. The external I/O controller 104 may exchange information with components of CPU 102 using point-to-point or other interfaces.

Storage device 106 may comprise any suitable storage device, such as a solid state drive, a hard disk drive, system memory (e.g., a dual in-line memory module), or other type of storage device. Storage device 106 may store any suitable data, such as data used by processor 108 to provide functionality of computer system 100. For example, data associated with programs that are executed or files or data logs accessed by cores 114 may be stored in storage device 106. Thus, a storage device 106 may include a memory that stores data and/or sequences of instructions that are used or executed by the cores 114. In various embodiments, a storage device 106 may store persistent data (e.g., a user's data logs, files, or software application code) that remains stored even after power to the storage device 106 is removed. A storage device 106 may be dedicated to CPU 102 or shared with other devices (e.g., another CPU or other device) of computer system 100.

In the embodiment depicted, storage device 106A includes a memory 116 comprising a plurality of memory modules 122A-D (a storage device may include any suitable number of memory modules 122) and storage device controller 118. A memory module 122 includes a plurality of memory cells that are each operable to store one or more bits. The cells of a memory module 122 may be arranged in any suitable fashion, such as in columns and rows, tracks and sectors, three dimensional structures, or other manner. In various embodiments, the cells may be logically grouped into banks, blocks, pages (wherein a page is a subset of a block), frames, bytes, sectors, data log segments, or other suitable groups.

A memory module 122 may include non-volatile memory and/or volatile memory. Non-volatile memory does not require power to maintain the state of data stored in the memory. Nonlimiting examples of nonvolatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistorless stackable cross point architecture in which memory cells sit at the intersection of words lines and bit lines and are individually addressable and in which bit storage is based on a change in bulk resistance. In particular embodiments, a memory module 122 with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module 122 is synchronous dynamic random access memory (SDRAM). In particular embodiments, DRAM of the memory modules 122 complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of the storage devices 106 that implement such standards may be referred to as DDR-based interfaces.

Storage devices 106 may comprise any suitable type of memory and are not limited to a particular speed, technology, or form factor of memory in various embodiments. Storage devices 106 may include any suitable interface to communicate with CPU memory controller 112 or I/O controller 110 using any suitable communication protocol such as a DDR-based protocol, PCI, PCIe, USB, NVMe, SAS, SATA, FC, System Management Bus (SMBus), or other suitable protocol. In particular embodiments, storage device 106 may comprise multiple communication interfaces that each communicate using a separate protocol with CPU memory controller 112 and/or I/O controller 110.

Storage device controller 118 may include logic to receive requests from CPU 102 (e.g., via memory controller 112 or I/O controller 110), cause the requests to be carried out with respect to memory 116, and provide data associated with the requests to CPU 102 (e.g., via memory controller 112 or I/O controller 110). Controller 118 may also be operable to detect and/or correct errors encountered during memory operation. In an embodiment, controller 118 also tracks the number of times particular cells (or logical groupings of cells) have been written to in order to perform wear leveling and/or to detect when cells are nearing an estimated number of times they may be reliably written to. In various embodiments, controller 118 may also monitor various characteristics of the storage device 106 such as the temperature or voltage and report associated statistics to the CPU 102. Storage device controller 118 can be implemented on the same chip as memory 116 or on a different chip.

In various embodiments, the storage device 106 also includes an address translation engine 120. In the depicted embodiment, the address translation engine 120 is shown as part of the storage device controller 118, although in various embodiments, the address translation engine 120 may simply be communicably coupled to the storage device controller 118. In various embodiments, the address translation engine 120 may be integrated on the same chip as the storage device controller 118 or on a different chip.

In embodiments that include a storage device 106 capable of supporting traditional read and write commands (wherein an address of the data to be read or an address at which data is to be written is included in the command from the computing host along with the number of blocks to write or read), address translation engine 120 may include logic to store and update a mapping between an externally addressable address space (i.e., an address space visible to a computing host coupled to the storage device 106) and the actual physical address space of the memory 116 (which is not exposed to the computing host). In particular embodiments, address translation engine 120 may comprise a plurality of mapping entries that each map one or more addresses in the externally addressable memory space to one or more addresses in the physical address space.

In embodiments in which one or more namespaces implemented by the storage device 106 is dedicated to storing data that is sequentially written (referred to herein as "sequential data logs"), the computing host does not use an externally addressable address space when sending commands associated with such namespaces to the storage device 106. A namespace may be a logical partition of a memory 116. For example, a namespace may be a directory (e.g., a storage partition assigned to a drive letter) that may comprise any suitable number of data logs that are each uniquely identifiable within that namespace. For namespaces that are dedicated to sequentially written data, address translation engine 120 may maintain namespace information 124. Namespace information 124 may include information (e.g., keys) from which the physical locations of data log segments of sequential data logs may be determined. An example of such information is described further in connection with FIG. 2.

Namespace information 124 may be included within the address translation engine and/or storage device controller 118 or may simply be communicably coupled to the address translation engine and/or storage device controller. In various embodiments, memory that stores namespace information may be integrated on the same chip as the storage device controller 118 and/or address translation engine 120 or may be implemented on a separate chip. In various embodiments, address translation engine 120 and/or storage device controller 118 may include logic to determine the physical locations of the data logs and data log segments based on data included in the namespace information 124.

In various embodiments, a storage device 106 may support traditional read and write commands for some data logs stored on the storage device and specialized commands for sequential data logs. For example, the storage device 106 may be divided into logical partitions, such as namespaces, and each partition may either support traditional read and write commands or specialized commands for sequential data logs. Thus, in some embodiments, address translation engine 120 may maintain a mapping of an externally addressable address space to the physical memory space for partitions that allow traditional read and write commands and may maintain namespace information 124 for partitions that allow append operations.

In various embodiments, the address translation engine 120 (in conjunction with the storage device controller 118) may also provide wear leveling by managing the address mappings or the namespace information 124. In particular embodiments, the address translation engine 120 is also used to prevent the use of bad memory cells (or logical grouping of cells) by not allowing physical addresses for the bad cells (or logical grouping of cells) to be mapped to the externally addressable address space or to the keys of the namespace information 124. Moreover, the address translation engine 120 may prevent the writing of data to the bad memory cells.

The address translation engine 120 may include any suitable memory type for storing the mapping entries or namespace information 124 and any suitable logic for changing values stored in the mapping entries or namespace information 124 (e.g., in response to a request from the storage device controller 118) and reading values from the mapping entries or namespace information 124 (e.g., to provide the values to the storage device controller 118 for use in memory operations).

In the embodiment depicted, address translation engine 120 also includes key generator 126. Key generator 126 may be included within the address translation engine 120 and/or storage device controller 118 or may simply be communicably coupled to the address translation engine and/or storage device controller. In various embodiments, key generator 126 may be integrated on the same chip as the storage device controller 118 and/or address translation engine 120 or may be implemented on a separate chip.

Key generator 126 is operable to generate keys that correspond to data log segments of sequential data logs. A data log segment may represent a portion of a data log written to memory 116 via a data log append command. Each time a data log segment is appended to the end of a sequential data log a key may be generated and provided to the computing host.

The key represents any suitable information associated with the data log segment. The key may include location information allowing the determination of the physical address of memory 116 where the data log segment is stored (e.g., the physical address of the beginning of the data log segment). As one example, the location information may include the actual physical address of the data log segment. As another example, the location information may include a numerical offset (or an encoding thereof) from the start of the data log (i.e., the physical address of the first data log segment of the data log) to which the data log segment is appended (such that the physical address of the data log segment associated with the key is obtained by adding the offset to the physical address of the start of the data log). As yet another example, the location information may include an encoding of the physical address of the start of the data log segment. In various embodiments, the number of bits used to represent the encoding of the physical address may be greater than, equal to, or less than the number of bits used to represent the actual physical address. When provided with the location information of a key, the address translation engine 120 is able to determine the corresponding physical address. The address translation engine 120 may determine the physical address in any suitable manner, such as by performing one or more calculations on an encoded physical address, using an encoded physical address as the input for a table lookup (e.g., a table may store each encoded address and their corresponding physical addresses), or using any other suitable method.

In various embodiments, prior to being written to memory, data to be written via a data log append command may be compressed by compression engine 128 of the storage device 106. Compression engine 128 is operable to receive data associated with a traditional write command or a data log append command, compress the data, and provide the compressed data to be written to memory. Compression engine 128 may also be operable to receive compressed data retrieved from memory, decompress the data into the form in which it was received prior to compression, and provide the decompressed data to be sent to a computing host (e.g., in response to a command to read from a data log). In various embodiments, the compression engine 128 may be included within the storage device controller 118 or may simply be communicably coupled to the storage device controller. In some embodiments, the compression engine 128 may be integrated on the same chip as the storage device controller 118 or may be implemented on a different chip.

In various embodiments, the key generated for a data log segment that is compressed before being written to memory in response to an append data log command may include information associated with the compression. For example, the key may indicate the uncompressed length of the data log segment (i.e., the length of the data received from the computing host in association with the data log append command) and/or the compressed length of the data log segment. In one embodiment, the key includes both the uncompressed length of the data log segment and the compressed length of the data log segment (or a ratio thereof). In another embodiment, the key may include information about multiple compressed portions of the data log segment. For example, the key may indicate the number of compressed portions that make up the data log segment or that make up a particular length of data within the data log segment (such as the append unit size). Such information may be used in processing a read sequential data log command in order to return the correct amount of uncompressed data specified by the read sequential data log.

In some embodiments, all or some of the elements of system 100 are resident on (or coupled to) the same circuit board (e.g., a motherboard). In various embodiments, any suitable partitioning between the elements may exist. For example, the elements depicted in CPU 102 may be located on a single die or package (i.e., on-chip) or any of the elements of CPU 102 may be located off-chip. Similarly, the elements depicted in storage device 106A may be located on a single chip or on multiple chips.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments an integrated I/O subsystem includes point-to-point multiplexing logic between various components of system 100, such as cores 114, one or more CPU memory controllers 112, I/O controller 110, integrated I/O devices, direct memory access (DMA) logic (not shown), etc.

Although not depicted, system 100 may use a battery and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102.

Figure 2:
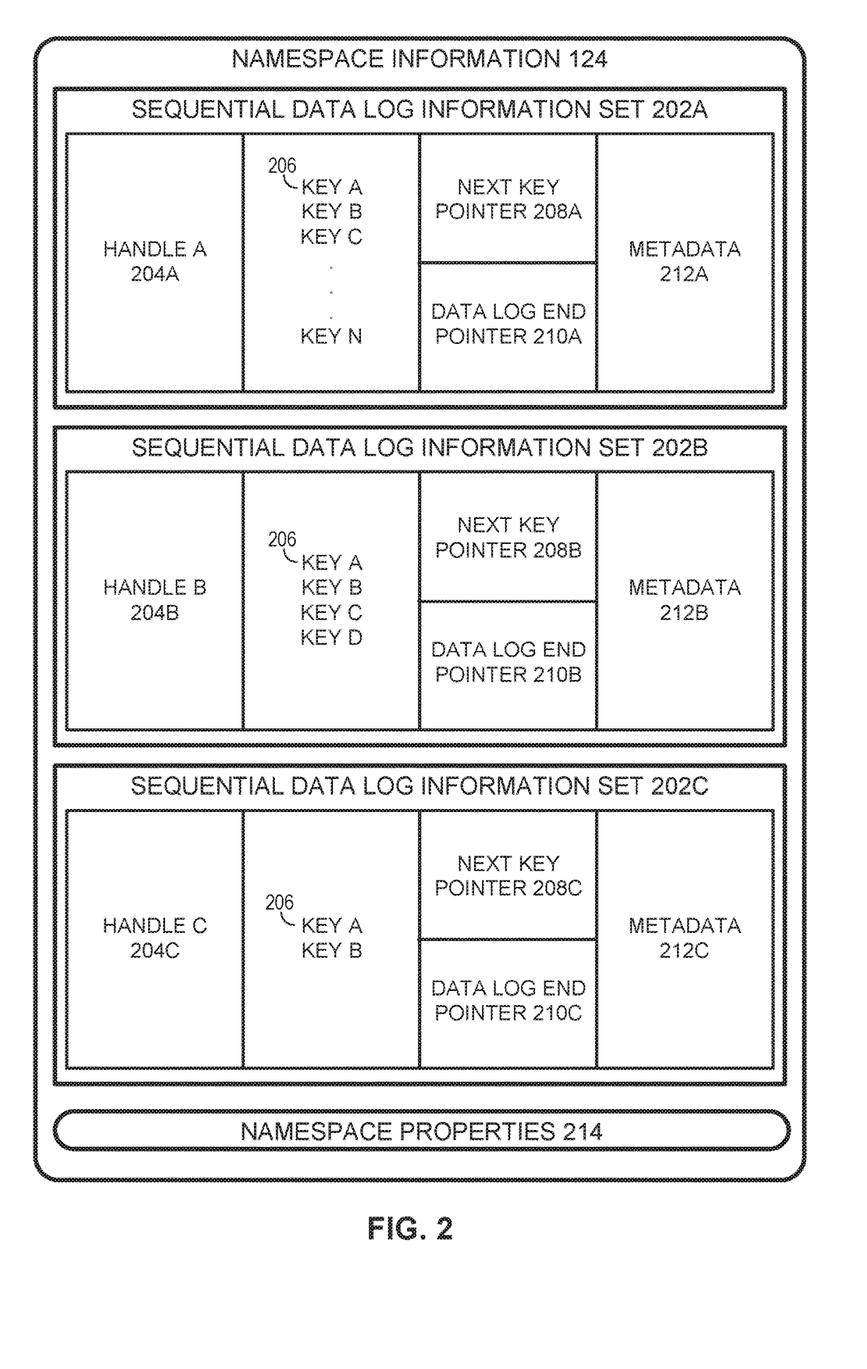
FIG. 2 illustrates example namespace information that may be stored by a storage device of a computer system in accordance with certain embodiments.

FIG. 2 illustrates example namespace information 124 that may be stored by storage device 106 in accordance with certain embodiments. In various embodiments, the memory 116 of a storage device 106 may be divided up into one or more namespaces. Namespace information 124 may include any suitable information associated with one or more namespaces implemented by storage device 106.

In the embodiment depicted, namespace information 124 includes information for a single namespace, though other embodiments may include similar information for each of a plurality of namespaces. The particular namespace illustrated includes three data logs, though a namespace may include any suitable number of data logs. Sequential data log information set 202A includes information for a first sequential data log A stored in memory 116, sequential data log information set 202B includes information for a second sequential data log B stored in memory 116, and sequential data log information set 202C includes information for a third sequential data log C stored in memory 116. Namespace information 124 may also include namespace properties 214 which may include any combination of information describing the namespace, such as a handle of the namespace, a size of the namespace, whether the namespace supports commands associated with sequential data logs (such as commands of the command set described below), the number of sequential data logs that may be used concurrently within the namespace, a specification of an append unit size to be used in commands associated with sequential data logs (e.g., a data log append or read sequential data log command specifying a length of an append or read operation may specify the length in terms of the append unit size), or other information.

Each sequential data log information set 202 includes a handle 204 identifying a name of the respective data log. Each sequential data log information set 202 also includes zero or more keys 206 that are each generated when a data log segment is appended to the end of a sequential data log. Each sequential data log information set 202 also includes a next key pointer 208 that stores an indication of a physical address after the end of the last segment of the sequential data log (e.g., the next physical address that data will be written to when the next data log append command is processed) as well as a data log end pointer that stores an indication of the end of the data log (e.g., the last allocated physical address for the data log). Each sequential data log information set 202 may also include a set of metadata 212 describing the associated data log. Metadata 212 may include any suitable information associated with the data log, such as the type of the data log, when the data log was last accessed, whether the data log is associated with one or more other data logs and if so the handles of such data logs (e.g., a data log may be subset of another data log), the level of a data log (e.g., a data log that is a log for an SQL database may be associated with a particular level), or any other suitable information.

An example command set for a storage device 106 storing sequential data logs will now be explained with reference to the namespace information 124. In other embodiments, the command set may include additional commands, may omit some of the described commands, or may include variations on described commands. For purposes of explanation, a command set that supports a data log append command may be referred to herein as an append command set.

A create namespace command may be used to create a new namespace on storage device 106. The create namespace command may allow specification of any information associated with the namespace, such as any information of the namespace properties 214 described above. For example, the create namespace command may allow specification of whether the namespace will support the append command set (and thus in some embodiments the create namespace command may also be used to create a namespace that will support traditional read and write commands). In some embodiments, if a namespace supports the append command set, the namespace will not support traditional read and write commands. As described above, such embodiments may drastically simplify the address translation layer of the storage device 106. Information received in a create namespace command may be stored in namespace properties 214. A get namespace properties command may allow retrieval of namespace properties 214 for a particular namespace identified in the command.

A create sequential data log command may be used to create a new data log that may be written to using a data log append command. Thus, the create sequential data log command may be used to create a data log that will only be written to in a sequential manner. In various embodiments, the create sequential data log may specify any one or more of a namespace in which the data log will be created, a handle for the data log, or a size of the data log. In various embodiments, using the create sequential data log to create a data log in a namespace may prevent the usage of traditional read and write commands as to that namespace.

A write sequential data log metadata command may be used to specify metadata 212 for a sequential data log identified in the command (e.g., via the handle of the sequential data log). Any suitable metadata may be written for the data log, such as that described above with respect to metadata 212. The metadata 212 may be read using a get sequential data log metadata command specifying the handle of the sequential data log.

The data log append command may be used to write data to the end of a sequential data log. The data log append command may identify the sequential data log that it is writing to (e.g., via a handle of the data log) and the data to be written to the sequential data log. The data may be identified in any suitable manner. For example, the data or a reference to the data may be included within the data log append command or may be provided in one or more separate communications. For example, in one embodiment, the data log append command may specify a location (e.g., a buffer) of the data that is to be written to the end of the sequential data log.

In various embodiments, the data log append command may specify the length of the data to be appended. Any suitable unit may be used to specify the length of the data, such as bytes, the append unit size specified in namespace properties 214, or other logical unit of data. In various embodiments, a data log append command may be associated with a minimum length of data (e.g., 512 bytes, 4 KB, or other minimum size) that may be appended in order to enhance efficiency. In particular embodiments, this minimum length may be specified as the append unit size or a multiple thereof.

The data log append command may return a key associated with the data (i.e., data log segment) that is appended to the end of the append data log in response to the data log append command. As described earlier, the key may enable the storage device 106 to identify the physical address of the data when the data is read.

A read sequential data log command may be used to read a group of data (e.g., a data log segment) that was written via a data log append command. The read sequential data log includes the key that was returned via the data log append command that wrote the data to be read. As described earlier, this key enables storage device 106 to locate the physical location in memory 116 at which the data is stored. In various embodiments, the read sequential data log may identify the sequential data log that it is reading from (e.g., via a handle of the data log). In various embodiments, the read sequential data log command may specify the length of the data to be read. In some embodiments, if the length is not included in the read sequential data log command, the entire data log segment that was appended via the data log append command that wrote the data may be read (e.g., the storage device 106 may read from the physical address indicated by the received key up until the physical address indicated by the key that corresponds to the next data log segment). Any suitable units may be used to specify the length of the data, such as bytes, the append unit size specified in the namespace properties 214, or other logical unit of data. In various embodiments, a read sequential data log command may be associated with a minimum length of data to be read (e.g., 512 bytes, 4 KB, or other minimum size) in order to enhance efficiency. In particular embodiments, this minimum length may be specified via the append unit size or a multiple thereof. In some embodiments, the read append data log command may indicate a location (e.g., via a pointer) indicating where the data should be transferred to.

An unmap sequential data log command may delete a sequential data log or a portion thereof. The unmap sequential data log may identify the sequential data log that is to be erased (e.g., via a handle of the data log). In a particular embodiment, the unmap sequential data log deletes an entire data log. In another embodiment in which the unmap sequential data log may include an option to delete a portion of a sequential data log, the unmap sequential data log may include identification of the portion of the sequential data log to delete. For example, the unmap sequential data log command may include an integer identifying the number of data log segments to be deleted (in reverse order starting from the last data log segment of the sequential data log). As another example, the unmap sequential data log may identify one or more data log segments to be deleted by providing the keys associated with those data log segments. The unmap sequential data log releases the memory that previously stored the sequential data log (or data log segments thereof). In various embodiments, the memory may be physically erased at the time the unmap sequential data log command is received. In other embodiments, the memory may be released to store other data, but is not erased until the memory is to be used to store other data (e.g., in response to receiving a data log append command or a create sequential data log command). The unmap sequential data log command differs from a traditional unmap command which may specify a logical block address and a number of logical blocks to erase.

In various embodiments, the command set may include other administrative commands. For example, a get sequential data log list command may return a list of all of the sequential data logs for a specified namespace. As another example, a get sequential data log keys command may return all of the keys (e.g., in sequential order) for a specified sequential data log (e.g., the handle of the sequential data log may be specified in the get sequential data log keys command).

Figure 3:
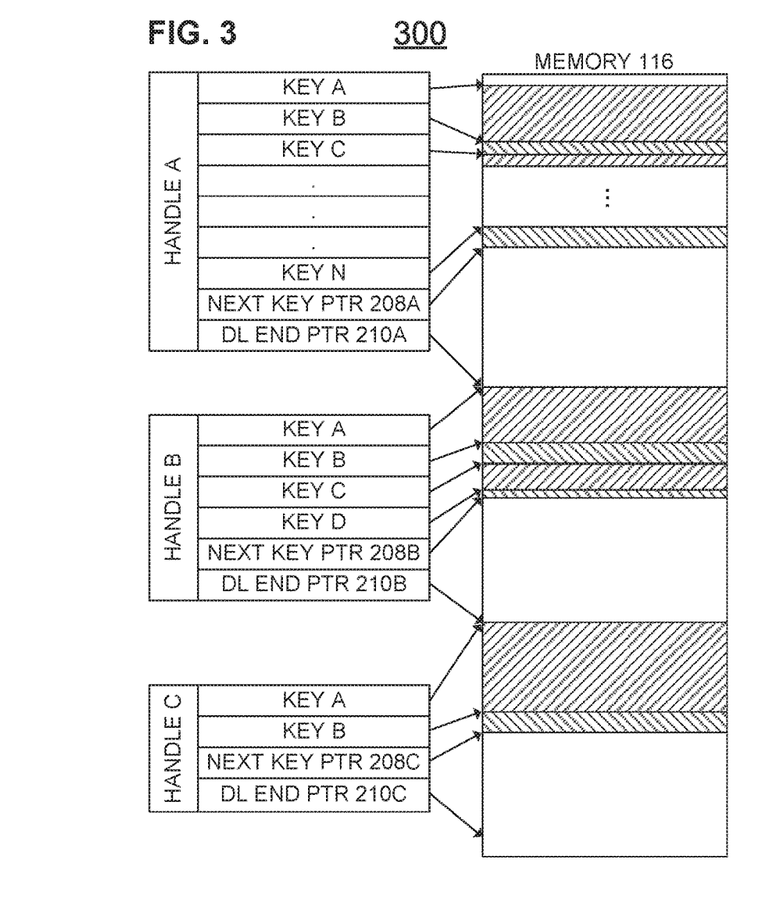
FIG. 3 illustrates an example state of data of a storage device in accordance with certain embodiments.

FIG. 3 illustrates an example state 300 of data of a storage device 106 in accordance with certain embodiments. State 300 depicts portions of three sequential data log information sets 202A-202C for sequential data logs respectively identified by handles A, B, and C. Sequential data log information set 202A includes N keys associated with sequential data log A. Each key includes location information allowing the identification of a corresponding physical memory location of the start of a data log segment of sequential data log A (this is conceptually depicted by the arrows between the keys and the memory 116). Sequential data log information set 202A also includes a next key pointer 208A that points to the next memory address after the end of the last data log segment of the sequential data log. When an additional data log append command is received for sequential data log A, the key created will include location information allowing the identification of the memory location pointed to by the next key pointer 208A and then the next key pointer will be updated to point to the next memory address after the end of that data log segment (e.g., the next key pointer 208A may be incremented by the length of the data written by the sequential data log command). Sequential data log information set 202A also includes a data log end pointer 210A pointing to the end of the sequential data log A (e.g., to the last physical address allocated for the sequential data log). The portion of memory 116 from the next key pointer 208A to the data log end pointer 210A may represent unused memory that is allocated for the sequential data log. Sequential data log information sets 202B and 202C depict similar information for sequential data logs B and C respectively.

Figure 4:
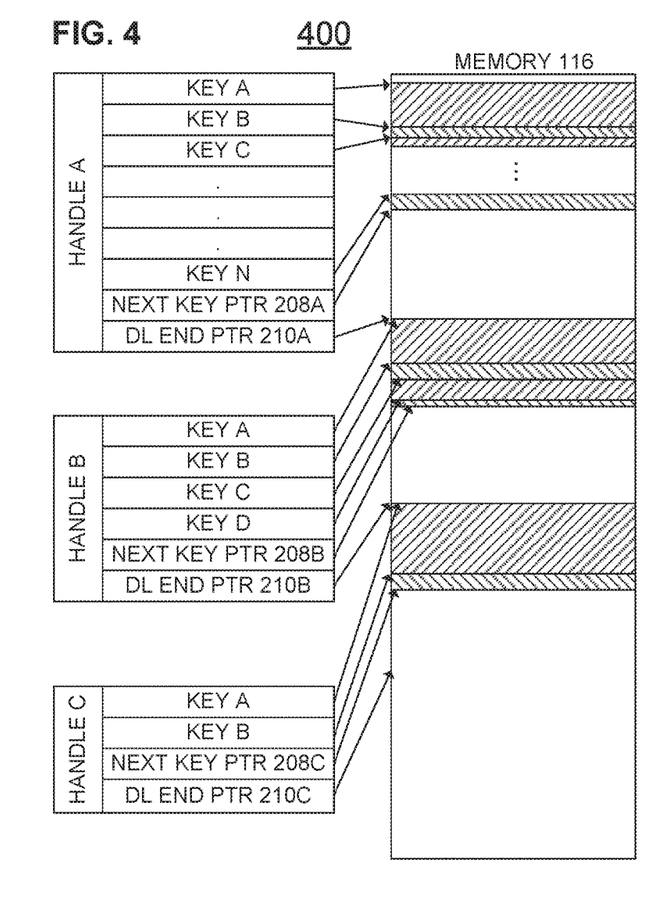
FIG. 4 illustrates an example state of data compressed by a storage device in accordance with certain embodiments.

FIG. 4 illustrates an example state 400 of data compressed by a storage device 106 in accordance with certain embodiments. The state depicted assumes that the same data depicted in FIG. 3 is stored by memory 116, but also assumes compression is performed by storage device 106 prior to the data being written. The amount of data taken up by each data log segment is decreased. The keys of each sequential data log now include location information allowing the determination of the physical location in memory 116 of the compressed data log segments. The keys may also include compression information, such that when a sequential data log read command is received specifying, for example, a number of bytes to read (wherein this number is specified with respect to the uncompressed data), the correct amount of compressed data may be read and decompressed before returning the data specified by the sequential data log read command.

Figure 5:
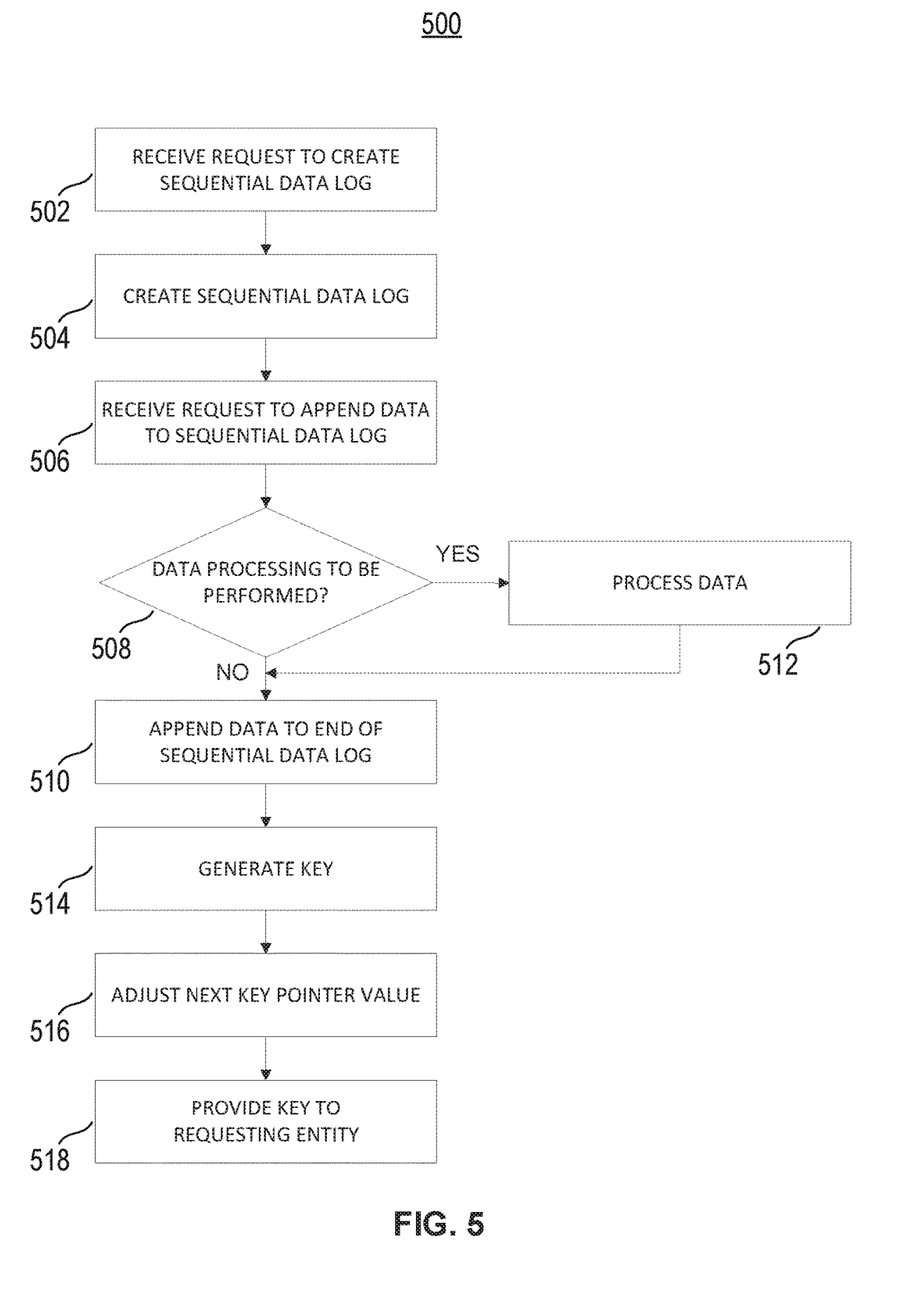
FIG. 5 illustrates an example flow for appending data to a data log stored on a storage device in accordance with certain embodiments.

FIG. 5 illustrates an example flow 500 for appending data to a data log stored on a storage device 106 in accordance with certain embodiments. The flow 500 depicts example operations that may be performed by any suitable logic, such as one or more components of a storage device 106.

At 502, a request to create a new data log is received. As one example, the request may be a create sequential data log as described above. At 504, the sequential data log is created. The sequential data log is created in any suitable manner, such as by allocating a portion of memory 116 for the sequential data log and creating a sequential data log information set to store keys and other information associated with the sequential data log. A next key pointer value may be initialized to the start address of the sequential data log and a data log end pointer may be set to the end of the portion of the memory 116 allocated for the sequential data log.

At 506, a request to append data to the data log is received (e.g., from a computing host). As one example, the request may be a data log append command as described above. At 508, it is determined whether data processing is to be performed on the data before it is written to the memory 116. For example, it may be determined whether the data is to be compressed and/or encrypted by storage device 106. If the data is to be processed, the processing occurs at 512. While operation 508 is merely included as a conceptual illustration to show that some embodiments may include additional processing of the data before the data is written to memory while some embodiments do not, in particular embodiments, an actual determination of whether data processing is to be performed may be made by the storage device 106 (e.g., whether the data is to be processed may be configured by the computing host or other entity).

At 510, data identified by the request to append data is appended to the end of the sequential data log. When the first data log append command is received, the data is placed at the beginning of the data log. When subsequent data log append commands are received, the data is placed after the last data log segment of the data log. At 514, a key associated with the data is generated. As described above, the key includes location information allowing the determination of the physical address of appended data. In particular embodiments, the value of the key is based on the value of next key pointer which (at the time the data log append command is received) specifies the memory address of the start of the recently appended data.

At 516, the value of the next key pointer is adjusted such that it refers to the next address after the end of the data that was appended to the end of the data log. In one embodiment, the new value of the next key pointer is obtained by adding the current value of the next key pointer to the length of the data that was appended to the end of the data log. In some embodiments, the length may be obtained from information included in the request to append the data (e.g., the length may be explicitly specified in the request).

At 518, the key is provided to the requesting entity (e.g., a computing host). Additional requests to append data to the sequential data log may be accomplished by repeating steps 506-518.

The flow described in FIG. 5 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 5 may be repeated, combined, modified or deleted where appropriate. Additionally, operations may be performed in any suitable order without departing from the scope of particular embodiments.

Figure 6:
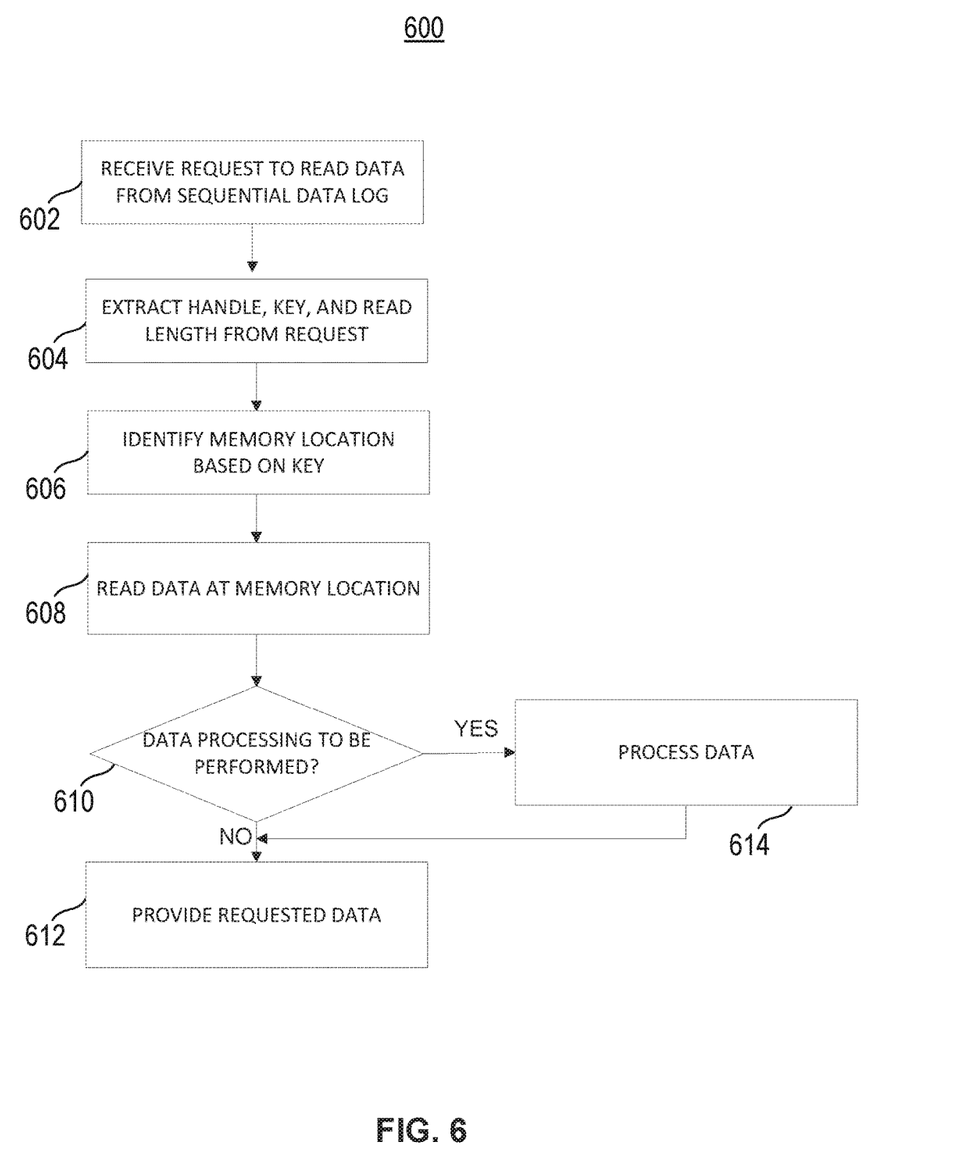
FIG. 6 illustrates an example flow for reading data of a data log stored on a storage device in accordance with certain embodiments.

FIG. 6 illustrates an example flow 600 for reading data of a data log stored on a storage device 106 in accordance with certain embodiments. The flow 600 depicts example operations that may be performed by any suitable logic, such as one or more components of a storage device 106 in communication with a host computing device, such as CPU 102.

At 602, a request to read data from a sequential data log is received. As one example, the request may be a read sequential data log command as described above. At 604, an identifier of the sequential data log (e.g., a handle), a key, and a read length are extracted from the request. At 606, a physical memory location is identified based on location information included in the key. The memory location may be the physical address of the start of a data log segment of the sequential data log.

At 608, data is read from the memory location. In various embodiments, the amount of data read may be based on the read length received in the request (or the entire data log segment may be read). At 610, it is determined whether data processing is to be performed on the retrieved data. For example, it may be determined whether the data is to be decompressed and/or unencrypted by storage device 106. If the data is to be processed, the processing occurs at 614. While operation 610 is merely included as a conceptual illustration to show that some embodiments may include additional processing of the data before the data is provided to the requesting entity while some embodiments do not, in particular embodiments, an actual determination of whether data processing is to be performed may be made by the storage device 106. At 612, the requested data is provided to the requesting entity (e.g., a computing host).

The flow described in FIG. 6 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 6 may be repeated, combined, modified or deleted where appropriate. Additionally, operations may be performed in any suitable order without departing from the scope of particular embodiments.

In particular embodiments, the append command set may be provided within an existing protocol used to communicate between computing hosts and storage devices. For example, any of the commands described herein may be used in accordance with the NVMe specification (e.g., by implementing the commands using vendor specific regions of the specification).

In various embodiments, a storage device 106 may be capable of implementing multiple different namespaces that each is compatible with a respective command set. For example, one namespace may include sequential data logs and utilize all or a portion of the append command set described herein while a different namespace may include other types of data logs and utilize a command set including traditional read and write commands. In a particular embodiment, creating a sequential data log in a namespace may prevent the use of traditional read and write commands on that namespace (and such commands may be disregarded by the storage device 106 if received in association with a data log of that namespace).

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database data log format such as Graphic Data System II (GDS II), Open Artwork System Interchange Standard (OASIS), or similar format.

In some implementations, software based hardware models, and HDL and other functional description language objects can include register transfer language (RTL) data logs, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design data logs that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the functionality of the various components such as CPU 102, external I/O controller 104, processor 108, core 114, I/O controller 110, CPU memory controller 112, storage device 106A, memory 116, storage device controller 118, address translation engine 120, key generator 126, compression engine 128, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium may store information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In at least one embodiment, an apparatus comprises a storage device to receive, from a computing host, a request to append data to a data log; identify a memory location after a last segment of the data log; and append the data to the data log by writing the data to the memory location after the last segment of the data log; and provide, to the computing host, a key comprising an identification of the memory location at which the data was appended to the data log.

In at least one embodiment, the key comprises an encoding of the memory location at which the data was appended to the data log. In at least one embodiment, the key includes a numerical offset based on a memory location of a start of the data log. In at least one embodiment, the request further comprises a length of the data to be appended. In at least one embodiment, the storage device is further to compress the data prior to writing the data to the memory location after the last segment of the data log. In at least one embodiment, the key identifies the memory location of the compressed data. In at least one embodiment, the key includes information indicating a relationship between a length of the data received from the computing host and a length of the compressed data. In at least one embodiment, the storage device is further to receive a request to read at least a portion of the data, the request comprising the key; and retrieve the at least a portion of the data based on the key. In at least one embodiment, the request to read the at least a portion of the data further comprises a length of the at least a portion of the data, and wherein the retrieval of the at least a portion of the data is further based on the length. In at least one embodiment, the storage device is further to receive a request to unmap the data log; and delete the data log in response to the request to unmap the data log.

In at least one embodiment, a method comprises receiving, from a computing host, a request to append data to a data log; identifying a memory location after a last segment of the data log; appending the data to the data log by writing the data to the memory location after the last segment of the data log; and providing, to the computing host, a key comprising an identification of the memory location at which the data was appended to the data log.

In at least one embodiment, the key comprises an encoding of the memory location at which the data was appended to the data log. In at least one embodiment, the key includes a numerical offset based on a memory location of a start of the data log. In at least one embodiment, the request further comprises a length of the data to be appended. In at least one embodiment, the method further comprises compressing the data received from the computing host prior to writing the data to the memory location after the last segment of the data log. In at least one embodiment, the key identifies the memory location of the compressed data. In at least one embodiment, the key includes information indicating a relationship between a length of the data received from the computing host and a length of the compressed data. In at least one embodiment, the method further comprises receiving a request to read at least a portion of the data, the request comprising the key; and retrieving the at least a portion of the data based on the key. In at least one embodiment, the request to read the at least a portion of the data further comprises a length of the at least a portion of the data, and the retrieval of the at least a portion of the data is further based on the length. In at least one embodiment, the method further comprises receiving a request to unmap the data log; and deleting the data log in response to the request to unmap the data log.

In at least one embodiment, a system comprises a processor to issue a request to append data to a data log; and a storage device comprising a memory and a storage device controller. The storage device controller is to receive, from the processor, the request to append the data to the data log; identify a location of the memory that is after a last segment of the data log; append the data to the data log by writing the data to the location of the memory that is after the last segment of the data log; and provide, to the computing host, a key comprising an identification of the memory location at which the data was appended to the data log.

In at least one embodiment, the key comprises an encoding of the memory location at which the data was appended to the data log. In at least one embodiment, the key includes a numerical offset based on a memory location of a start of the data log. In at least one embodiment, the storage device controller is further to compress the data received from the computing host prior to writing the data to the memory location after the last segment of the data log. In at least one embodiment, the system further comprises one or more of: a battery communicatively coupled to the processor, a display communicatively coupled to the processor, or a network interface communicatively coupled to the processor.

In at least one embodiment, a computer readable non-transitory tangible medium comprises program code that when executed is operable to generate a request to append data to a data log; send the request to append data to the data log to a storage device; and in response to the request to append data to the data log, receive, from the storage device, a key including location information comprising an identification the physical location at which the data was appended to the data log.

In at least one embodiment, the program code when executed further operable to generate a request to read data from the data log, the request comprising the key; send the request to read data from the data log to the storage device; and receive the data in response to the request to read the data from the data log.

In at least one embodiment, an apparatus comprises means to receive, from a computing host, a request to append data to a data log; means to identify a memory location after a last segment of the data log; means to append the data to the data log by writing the data to the memory location after the last segment of the data log; and means to provide, to the computing host, a key comprising an identification of the memory location at which the data was appended to the data log.

In at least one embodiment, the key comprises an encoding of the memory location at which the data was appended to the data log. In at least one embodiment, the key includes a numerical offset based on a memory location of a start of the data log.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
  a storage device comprising a memory and a controller, the storage device to:
    receive, from a computing host, a request to append data to a data log;
    identify a memory location after a last segment of the data log;
    append the data to the data log by writing the data to the memory location after the last segment of the data log;
    provide, to the computing host, a key comprising an identification of the memory location at which the data was appended to the data log;
    store the data log in a first namespace that supports a data log append operation that returns a key comprising an identification of a memory location at which data was appended to the computing host as a result of the data log append operation; and
    store other data in a second namespace that does not support the data log append operation.

2. The apparatus of claim 1, wherein the key comprises an encoding of the memory location at which the data was appended to the data log.

3. The apparatus of claim 1, wherein the key includes a numerical offset based on a memory location of a start of the data log.

4. The apparatus of claim 1, wherein the request further comprises a length of the data to be appended.

5. The apparatus of claim 1, wherein the storage device is further to compress the data prior to writing the data to the memory location after the last segment of the data log.

6. The apparatus of claim 5, wherein the key identifies the memory location and a length of the compressed data.

7. The apparatus of claim 1, the storage device further to:
  receive a request to read at least a portion of the data, the request comprising the key; and
  retrieve the at least a portion of the data based on the key.

8. The apparatus of claim 1, wherein the request to read the at least a portion of the data further comprises a length of the at least a portion of the data, and wherein the retrieval of the at least a portion of the data is further based on the length.

9. The apparatus of claim 1, the storage device further to:
  receive a request to unmap the data log; and
  delete the data log in response to the request to unmap the data log.

10. A method comprising:
  receiving, from a computing host, a request to append data to a data log;
  identifying a memory location after a last segment of the data log;
  appending the data to the data log by writing the data to the memory location after the last segment of the data log;
  providing, to the computing host, a key comprising an identification of the memory location at which the data was appended to the data log;
  storing the data log in a first namespace that supports a data log append operation that returns a key comprising an identification of a memory location at which data was appended to the computing host as a result of the data log append operation; and
  storing other data in a second namespace that does not support the data log append operation.

11. The method of claim 10, wherein the key comprises an encoding of the memory location at which the data was appended to the data log.

12. The method of claim 10, wherein the key includes a numerical offset based on a memory location of a start of the data log.

13. The method of claim 10, further comprising compressing the data received from the computing host prior to writing the data to the memory location after the last segment of the data log.

14. The method of claim 13, wherein the key identifies the memory location and a length of the compressed data.

15. A system to comprise:
    a processor to issue a request to append data to a data log, the request comprising an identification of the data and an identification of the data log; and
    a storage device comprising:
        a memory; and
        a storage device controller to:
            receive, from the processor, the request to append the data to the data log;
            identify, based on the identification of the data log, a location of the memory that is after a last segment of the data log;
            append the data to the data log by writing the data to the location of the memory that is after the last segment of the data log;
            provide, to the processor, a key comprising an identification of the memory location at which the data was appended to the data log;
            store the data log in a first namespace that supports a data log append operation that returns a key comprising an identification of a memory location at which data was appended to the processor as a result of the data log append operation; and
            store other data in a second namespace that does not support the data log append operation.

16. The system of claim 15, wherein the key comprises an encoding of the memory location at which the data was appended to the data log.

17. The system of claim 15, wherein the key includes a numerical offset based on a memory location of a start of the data log.

18. The system of claim 15, wherein the storage device controller is further to compress the data received from the processor prior to writing the data to the memory location after the last segment of the data log.

19. The system of claim 15, further comprising one or more of: a battery communicatively coupled to the processor, a display communicatively coupled to the processor, or a network interface communicatively coupled to the processor.

20. A computer readable non-transitory tangible medium comprising program code that when executed is operable to:
    generate a request to append data to a data log;
    send the request to append data to the data log to a storage device; and
    in response to the request to append data to the data log, receive, from the storage device, a key including location information comprising an indication of a physical location of the storage device at which the data was appended to the data log, wherein the storage device is to store the data log in a first namespace that supports a data log append operation that returns a key comprising an identification of a memory location at which data was appended as a result of the data log append operation and store other data in a second namespace that does not support the data log append operation.

21. The medium of claim 20, the program code when executed further operable to:
    generate a request to read data from the data log, the request comprising the key;
    send the request to read data from the data log to the storage device; and
    receive the data in response to the request to read the data from the data log.

* * * * *